(12) United States Patent
Roessel et al.

(10) Patent No.: US 9,306,714 B2
(45) Date of Patent: Apr. 5, 2016

(54) METHOD AND APPARATUSES FOR CONFIGURING A COMMUNICATION CHANNEL

(75) Inventors: Sabine Roessel, Munich (DE); Christian Mahr, Ulm (DE); Matti Tapani Kiiski, Oulunsalo (FI); Petri Olavi Jappila, Helsinki (FI); Carl Petter Engelbert Eklund, Helsinki (FI); Troels Emil Kolding, Klarup (DK); Martin Goldberg, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 126 days.

(21) Appl. No.: 14/130,588

(22) PCT Filed: Jul. 4, 2011

(86) PCT No.: PCT/EP2011/061200
§ 371 (c)(1),
(2), (4) Date: Mar. 3, 2014

(87) PCT Pub. No.: WO2013/004288
PCT Pub. Date: Jan. 10, 2013

(65) Prior Publication Data
US 2014/0248888 A1 Sep. 4, 2014

(51) Int. Cl.
*H04M 1/00* (2006.01)
*H04L 5/00* (2006.01)
(Continued)

(52) U.S. Cl.
CPC .......... *H04L 5/0035* (2013.01); *H04W 16/28* (2013.01); *H04W 64/00* (2013.01); *H04W 84/042* (2013.01)

(58) Field of Classification Search
CPC ..... H04W 16/28; H04W 16/30; H04W 16/32; H04W 64/00; H04W 64/003; H04W 64/006; H04W 84/042
USPC ........ 375/260, 219; 370/329, 328; 455/422.1, 455/443, 450, 451, 452.1, 456.1, 456.2, 455/456.3, 562.1
See application file for complete search history.

(56) References Cited

U.S. PATENT DOCUMENTS 4,217,588 A * 8/1980 Freeny, Jr. ................. G01S 5/14
340/988
5,423,056 A * 6/1995 Linquist .................... G01S 5/02
455/12.1
(Continued)

FOREIGN PATENT DOCUMENTS

WO WO 2010/103728 A1 9/2010

OTHER PUBLICATIONS

3GPP TR 36.814 V9.0.0 (Mar. 2010).*
(Continued)

Primary Examiner — Jean Gelin
(74) Attorney, Agent, or Firm — Harrington & Smith

(57) ABSTRACT

There is provided a method for configuring a communication channel between a base station and a user equipment within a cellular network system. The cellular network system includes at least one cooperation area. The base station is assigned to the at least one cooperation area, and the user equipment is served by the base station. The method includes applying, by the base station, a vertical sectorization and thereby creating the at least one cooperation area, determining, by the base station, the location of the user equipment in relation to the at least one cooperation area, and configuring, by the base station, the communication channel between the base station and the user equipment by using coordinated multipoint processing, if the determined location of the user equipment corresponds to a predetermined location.

20 Claims, 2 Drawing Sheets

(51) Int. Cl.
*H04W 16/28* (2009.01)
*H04W 84/04* (2009.01)
*H04W 64/00* (2009.01)

(56) References Cited

U.S. PATENT DOCUMENTS

| | | | | |
|---|---|---|---|---|
| 6,236,365 | B1* | 5/2001 | LeBlanc | G01C 21/206 342/450 |
| 7,738,886 | B1* | 6/2010 | Connolly | H04M 3/42229 455/411 |
| 8,570,373 | B2* | 10/2013 | Variyath | G01S 5/02 348/143 |
| 8,849,190 | B2* | 9/2014 | Hanson | H04B 7/15535 455/11.1 |
| 2011/0069633 | A1 | 3/2011 | Schmidt et al. | 370/254 |
| 2012/0184322 | A1* | 7/2012 | Falconetti et al. | 455/524 |
| 2013/0034000 | A1* | 2/2013 | Huo et al. | 370/252 |
| 2014/0003379 | A1* | 1/2014 | Kang | H04L 5/0053 370/329 |

OTHER PUBLICATIONS

Sawahashi, M., et al., "Coordinated multipoint transmission/reception techniques for LTE-advanced [Coordinated and Distributed MIMO]", Wireless Communications, IEEE (vol. 17, Issue 3), Jun. 2010, (pp. 26-34).

D'Amico, Valeria, et al., "Advanced interference management in ARTIST4G: Interference Avoidance", Wireless Technology Conference (EUWIT), 2010 European, IEEE, Piscataway, New Jersey, USA, Sep. 27, 2010, 4 pgs.

Sawahashi, M., et al., "Coordinated multipoint transmission/reception techniques for LTE-advanced [Coordinated and—Distributed MIMO]", Wireless Communications, IEEE (vol. 17, Issue 3), Jun. 2010, abstract only, 2 pgs.

* cited by examiner

METHOD AND APPARATUSES FOR CONFIGURING A COMMUNICATION CHANNEL

FIELD OF THE INVENTION

The present invention relates to the field of cellular communication networks and in particular to cellular communication networks which are organized in cooperation areas.

BACKGROUND OF THE INVENTION

Modern wireless communication networks often are organized in a cell structure. In LTE (3GPPP Long-Term Evolution), cells may be organized in so called cooperation areas. Cooperation areas may be defined by one or more base stations (eNodeBs, eNBs) each serving one or more cells. Between neighbouring cooperation areas or neighbouring cells within one cooperation area, interferences may occur, especially in edge regions of the cooperation areas (CAs).

For increasing the efficiency of cellular networks, vertical sectorization may be applied. However, while vertical sectorization as such can provide significant spectral efficiency enhancements the choice of the beam widths of the center and the edge beam may be decisive for the actual gains to obtain. Furthermore, interferences may be generated by the vertical sectorization.

In view of the above-described situation, there exists a need for an improved technique that enables to provide a cellular communication system substantially avoiding or at least reducing one or more of the above-identified problems. Hence, further methods to lower are needed.

SUMMARY OF THE INVENTION

This need may be met by the subject matter according to the independent claims. Advantageous embodiments of the herein disclosed subject matter are described by the dependent claims.

According to a first aspect of the herein disclosed subject matter, there is provided a method for configuring a communication channel between a base station (BS) and a user equipment (UE) within a cellular network system, the cellular network system comprising at least one cooperation area, wherein the base station is assigned to the at least one cooperation area, and wherein the user equipment is served by the base station, the method comprising applying, by the base station, a vertical sectorization and thereby creating the at least one cooperation area, determining, by the base station, the location of the user equipment in relation to the at least one cooperation area, and configuring, by the base station, the communication channel between the base station and the user equipment by using coordinated multipoint processing, if the determined location of the user equipment corresponds to a predetermined location.

This aspect of the invention is based on the idea that, by using a combination of vertical sectorization and coordinated multipoint (CoMP) processing, the disadvantages of vertical sectorization and CoMP may be avoided. By using vertical sectorization, additional cell average and cell edge spectral efficiency potential may be exploited. Actual base station architectures, introduced by HSPA/LTE, may allow for a vertical sectorization.

The term "vertical sectorization" may denote a modeling of the communication bandwidth. Vertical sectorization modeling may denote a kind of modeling wherein the transmission power of a cell in for instance 3-sector layout is shared between two vertical sectors. The same system bandwidth may be used for both sectors so that the amount of resources are doubled but the power per physical resource block is halved. By using vertical sectorization one or more cooperation areas may be created. Cooperation areas may be typically created in a dynamic way and are defined by one or more base stations. Vertical sectorization may lead to inter-site as well as to intra-site cooperation areas. Intra-site cooperation areas may refer to cooperation areas being associated with cells of one site, whereas inter-site cooperation areas may refer to cooperation areas being associated with cells of two or more sites.

The base station may comprise one or more antennas, as well as one or more beams. A beam may be an emission of rays corresponding to for example broadcast signals. A base station or an antenna of the base station may provide a specific characteristic of beams.

For example, in an embodiment, a base station or eNodeB may serve more than one cell. For example, a base station may use four antenna elements per cell.

According to an embodiment, the user equipment may be for example a mobile phone or a computer.

By using a combination of vertical sectorization and coordinated multipoint (CoMP) processing, solutions to the following problems may be provided. While vertical sectorization as such can provide significant spectral efficiency enhancements, the choice of the beam widths of the center and the edge beam may be decisive for the actual gains to obtain. Hence, further methods to lower the intra-site interference generated by the vertical sectorization may be needed.

While theoretical gains of CoMP both in Downlink and in Uplink are very high, cell edge throughput gains are typically in the order of up to 50% as for example 3GPP simulations show. One key aspect for pushing the cell edge gains rather to the high end is to choose the CoMP set in a UE-specific manner, and hence to optimally mix inter-site and intra-site gains. However, in particular Uplink inter-site CoMP cases create very high backhaul capacity requirements and hence are not favourable.

Instead of assuming CoMP in vertical direction, sectorization in vertical direction may be applied and can be the optimum channel adaptation in vertical direction.

This aspect of the invention is based on a base station architecture using vertical sectorization and may be applied on a use case of Downlink and Uplink CoMP. Furthermore, the idea applies as well to multi-stream HSPA+.

By using the method according to this aspect, the above mentioned problems may be avoided. As one advantage, the requirements for the vertical sectorization may be lowered, i.e. the base station may have lower requirements for searching for an optimal beam width (in particular for the center beam), as by using CoMP both in Downlink and in Uplink, it may be possible to avert rather wide center beam widths or badly chosen beam widths. In classical vertical sectorization the choice of precise tilt and beam width is essential to keep the sector overlap area small. When applying CoMP between edge and center sector, the former adverse interference can be utilized as a $2^{nd}$ path to and from the UE, applying the CoMP mechanism.

As a further advantage, applying UE-specific CoMP set selection in the Downlink and in the Uplink on the edge cell/beam exclusively may reduce the amount of UEs eligible for inter-site CoMP, and hence automatically reduce the backhaul requirements. UE-specific CoMP set selection may be based on high direction-on-arrival or strong neighbor cell measurements.

According to this aspect of the invention, the location of the UE may be determined in relation to the at least one cooperation. This may comprise a determination whether the UE is located inside or outside the at least one cooperation area. Further, this may comprise a determination whether the UE is located inside or outside a further cooperation area. If there exists a plurality of cooperation areas, for example two or more, the determination may comprise the determination of the location of the UE in relation to more than one cooperation, for example all cooperation areas.

According to an embodiment of the invention, the predetermined location corresponds to an overlap area between at least two cells of the cooperation area being associated to the base station.

In case two or more cells are associated with the base station, the base station may locate the UE to be either clearly only in one of its own cells or in an overlap section between own cells. In the first case, CoMP would not be applied. In the second case, CoMP would be applied, wherein the UE may be positioned in two or more adjacent cells. Practically, overlap areas may consist of two, three or four adjacent cells.

According to a further embodiment of the invention, wherein using coordinated multipoint processing is based on intra-site coordinated multipoint processing.

CoMP is considered by 3GPP as a tool to improve coverage, cell-edge throughput, and/or system efficiency. The main idea of CoMP is as follows: when a UE is in the cell-edge region, it may be able to receive signals from multiple cell sites and the UE's transmission may be received at multiple cell sites regardless of the system load. Given that, if the signaling transmitted from the multiple cell sites is coordinated, the DL performance can be increased significantly. This coordination can be simple as in the techniques that focus on interference avoidance or more complex as in the case where the same data is transmitted from multiple cell sites. For the UL, since the signal can be received by multiple cell sites, if the scheduling is coordinated from the different cell sites, the system can take advantage of this multiple reception to significantly improve the link performance.

CoMP communications can occur with intra-site or inter-site CoMP. According to this embodiment, when a UE is located in an overlap area between two or more own cells of the base station, intra-site CoMP may be applied, which means that the coordination is within a cell site.

Using intra-site CoMP, a significant amount of exchange of information may be possible since this communication is within a site and does not involve the backhaul (connection between base stations).

According to a further embodiment of the invention, the predetermined location corresponds to an overlap area between at least one cell of the cooperation area being associated to the base station and at least one cell of the cooperation area being associated to a further base station.

The UE may be located in overlap section between own cells of the base station and cells of a further or second base station of the cooperation area. The cooperation area comprises typically more than one base station.

According to a further embodiment of the invention, using coordinated multipoint processing is based on inter-site coordinated multipoint processing.

Inter-site CoMP may involve the coordination of multiple sites for CoMP transmission. Consequently, the exchange of information may involve backhaul transport.

Either all UEs in the edge cell/beam or a subset of them is considered for inter-site Joint Processing CoMP. This will by definition lower the X2 capacity constraints.

According to a further embodiment of the invention, determining the location of the user equipment within the cooperation area comprises requesting, by the base station, neighbor cell measurements from the user equipment.

In this embodiment, the user equipment performs neighbor cell measurements and the base station is adapted for determining the location of the user equipment based on these measurements. Neighbor cell measurements may be based on common measurements and may comprise a determination of the path loss to own and foreign neighbor cells.

According to a further embodiment of the invention, determining the location of the user equipment within the cooperation area comprises establishing, by the base station, a connection to the user equipment within cells associated to the base station.

In this embodiment, the base station may try to receive the UE on (own) neighbour cell without any prior measurement determining the uplink path loss.

According to a further embodiment of the invention, applying the vertical sectorization to the cooperation area comprises applying a vertical beamforming.

This embodiment is based on so called beamforming. Beamforming is a signal processing technique used for directional signal transmission or reception. This spatial selectivity is achieved by using adaptive or fixed receive/transmit beampatterns.

Beamforming may take advantage of interference to change the directionality of the beam. When transmitting, a beamformer controls the phase and relative amplitude of the signal at each transmitter, in order to create a pattern of constructive and destructive interference in the wavefront.

According to a further embodiment of the invention, the method further comprises determining whether the network capacity of the cellular network system is below a predetermined capacity, and if so, proceeding with the applying, by the base station, a vertical sectorization and thereby the creating of the at least one cooperation area, the determining, by the base station, the location of the user equipment in relation to the at least one cooperation area, and the configuring, by the base station, the communication channel between the base station and the user equipment by using coordinated multipoint processing, if the determined location of the user equipment corresponds to a predetermined location.

If the operator of the network determines that the capacity is sufficient, he may decide not to apply vertical sectorization. When the operator lacks network capacity, vertical sectorization in combination with CoMP may be applied as described above.

According to a second aspect of the invention, a base station for configuring a communication channel between the base station and a user equipment within a cellular network system may be provided, wherein the cellular network system comprises at least one cooperation area, wherein the base station is assigned to the at least one cooperation area, and wherein the user equipment is served by the base station. The base station comprises a control unit being adapted to apply a vertical sectorization and thereby to create the at least one cooperation area, a determination unit being adapted to determine the location of the user equipment in relation to the at least one cooperation area, a configuration unit being adapted to configure the communication channel between the base station and the user equipment by using coordinated multipoint processing, if the determined location of the user equipment corresponds to a predetermined location.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting unit, for example a transmitter. The receiver and the transmitter may be implemented as one single unit, for example as a transceiver. The transceiver or the receiving unit and the transmitting unit may be adapted to communicate with a further base station or the user equipment via an antenna.

The base station may comprise one or more antennas, as well as one or more beams. A beam may be an emission of rays corresponding to for example broadcast signals. A base station or an antenna of the base station may provide a specific characteristic of beams.

The control unit, the determination unit and the configuration unit may be implemented as single units or may be one unit being implemented for example as part of a standard control unit, like a CPU or a microcontroller.

A user equipment (UE) in the context of this description may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station.

The user equipment may further comprise a transmitting unit for transmitting signal. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

According to a third aspect of the invention, there is provided a cellular network system for configuring a communication channel between a base station and a user equipment within the cellular network system, the cellular network system comprising a least one base station as described above.

Generally herein, the method and embodiments of the method according to the first aspect may include performing one or more functions described with regard to the second or third aspect or an embodiment thereof. Vice versa, the base station or cellular network system and embodiments thereof according to the second and third aspect may include units or devices for performing one or more functions described with regard to the first aspect or an embodiment thereof.

According to a fourth aspect of the herein disclosed subject-matter, a computer program for configuring a communication channel, is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or nonvolatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of configuring a communication channel. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

Figure 1:
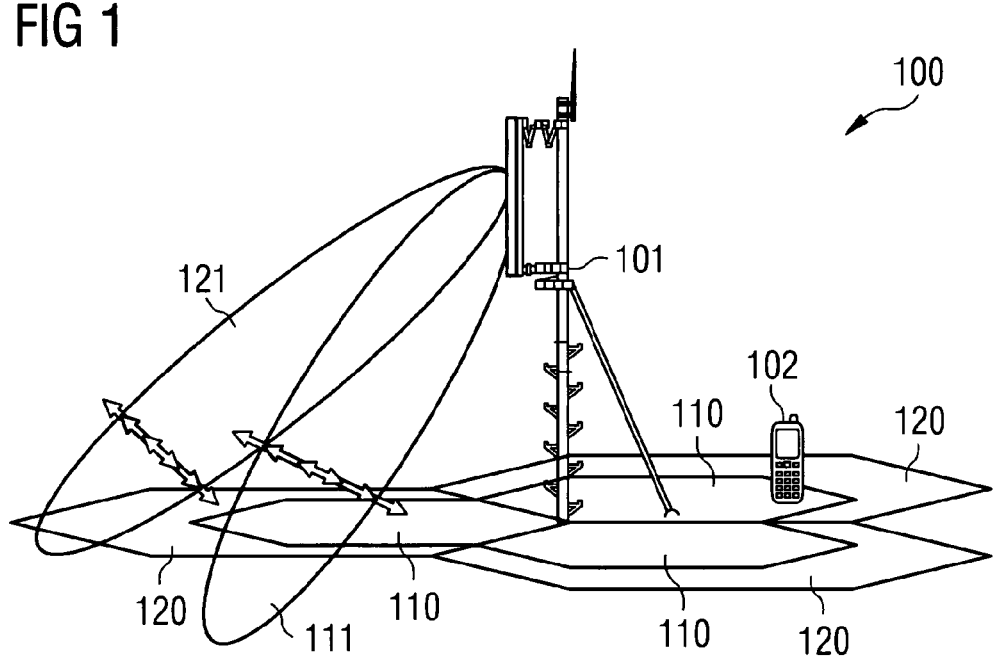
FIG. 1 shows a cellular network system according to an exemplary embodiment of the present invention.

The illustration in the drawing is schematically. It is noted that in different figures, similar or identical elements are provided with the same reference signs.

In the following, embodiments of the herein disclosed subject matter are illustrated with reference to the drawings and reference to aspects of current standards, such as LTE. However, such reference to current standards is only exemplary and should not be considered as limiting the scope of the claims.

FIG. 1 shows a cellular network system 100 according to an exemplary embodiment. The cellular network system comprises at least one cooperation area. A base station 101 is assigned to this cooperation area. A user equipment 102 is served by the base station.

In common network systems, horizontal antenna sectorization is used. According to this embodiment, vertical sectorization is applied. The sections of the cellular network system being associated with the first base station are sectorized into horizontal cells 110, 120. Further, vertical sectorization, by using for example vertical beam forming (see beams 111 and 121), is applied to the first base station. The idea behind the use of vertical sectorization is that it can allow a network operator to increase his network capacity by using two sectorizations.

Thus, the network as shown in FIG. 1 allows for Vertical Sectorization or Vertical Beamforming. To avoiding the problems being related to vertical sectorization, a combination of Vertical Sectorization and Coordinated Multipoint Processing is used to configure the communication channel of the cellular network system.

The base station can locate the UE to be either clearly (i) only in one of its own cells (not eligible for CoMP), (ii) in an overlap section between own cells (intra-site CoMP) or (iii) in overlap section between own cells and cells of another base station (inter-site CoMP).

Figure 2:
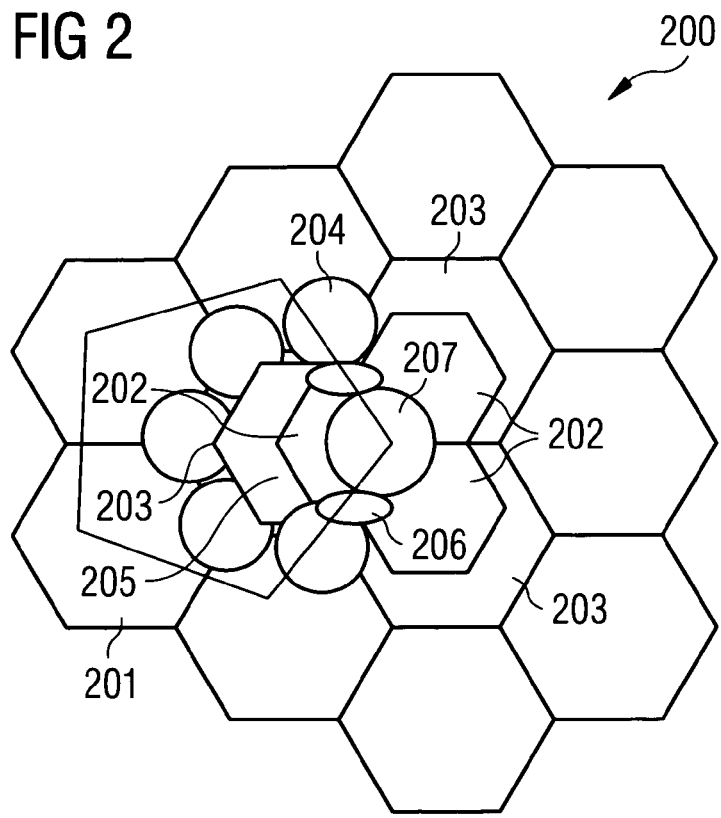
FIG. 2 shows cooperation cells in intra and inter site CoMP with vertical sectorization.

An example for cooperating cells 200 or a cooperation area is shown in FIG. 2. Cells 202 and 203 relate to horizontal sectorization, cell 201 to vertical sectorization. Areas 204, 205, 206 and 207 shows different overlap areas. Areas 204 define an overlap area of three cells, inter- and intra-site. Area 207 defines an overlap area of three cells intra-site. Areas 206 define an overlap area of four cells intra-site. Area 202 defines an overlap area of 2 cells intra-site.

Overlap areas can consist practically of two, three, or four adjacent cells. As shown in FIG. 2, a UE being located in the center cell 202 may be either only in one cell of the base station or in one or more cells of the base station. Here, intra-site CoMP (with two, three, or four cells) might be applied. UE's identified as cell center UE's will be not be subject to X2-communicated inter-site CoMP.

A UE being located in an edge cell 203 may be either only in one cell of the base station, in one or more cells of the base station, or in one or more cells of the base stations as well as in one or more cells of a further base station. Here, inter-site CoMP with three cells, and intra-site CoMP with two or three cells might be applied. Either all UEs in the edge cell/beam or a subset of them is considered for inter-site Joint Processing CoMP. This may lower the X2 capacity constraints.

The base station may locate the UE within horizontal and vertical orientation as follows:
 1. Request neighbour-cell measurements from the UE and determine pathloss to (own and foreign) neighbour cells
 2. Try to receive the UE on (own) neighbour cell without any prior measurement determining uplink pathloss Upper bounds on interference-limited and noise-limited gains in UL (uplink) and in DL (downlink) CoMP based on Shannon and MIMO gain considerations may indicate the following benefits:

By applying intra-site CoMP, the area spectral efficiency (here, the capacity of a sector) may be ideally increased by 100% if the sector is split into two cells with each having the same spectrum available. The gain also depends on how sharply the vertical beams are separated. The UEs residing in the overlap area can be subject to (intra-site) CoMP such that a further increase in the area spectral efficiency can be achieved.

So, one advantage of combining Vertical Sectorization and intra-site CoMP may be the gain in spectral efficiency while at the same time no transport constraints need to be considered (as it is intra-site CoMP) as well as a rather straight forward assumptions on the CoMP cooperation sets can be used.

In the following, some spectral efficiency gain examples are shown.

Coordination of cell center and cell edge beam (205 in FIG. 2): A pessimistic upper bound value for the sector area spectral efficiency gain for two cooperating cells (=center and edge beams) is 100%. So for example, assuming 20% of the UEs in the sector 205 would further enhance the sector area spectral efficiency by 25%.

Coordination of intra-site neighbouring sectors (206 in FIG. 2): A pessimistic upper bound value for the sector area spectral efficiency gain for four cooperating cells (=center and edge beams) is 300%. So for example, assuming 5% of the UEs in the sector area would belong to overlap areas 206, this would further enhance the sector area spectral efficiency by 30%.

Coordination of intra-site neighbouring sectors (207 in FIG. 2): A pessimistic upper bound value for the sector area spectral efficiency gain for three cooperating cells (=three center beams) is 200%. So for example, assuming 10% of the UEs in the sector area would belong to overlap area 207, this would further enhance the sector area spectral efficiency by 20%.

In case of inter-site CoMP, thanks to the vertical sectorization, also the set of UEs eligible to inter-site CoMP may be well "pre-defined" as all or a subset of the UEs belonging to the edge beam/cell. The big advantage of such a preselection may allow for reducing the amount of information that must be communicated across X2 for inter-site CoMP as the following example shows:

Estimated UL backhaul savings in case of inter-site CoMP: Assuming that only for 25% of the UE's in the sector require inter-site FFT-processed PRBs communication, it may be assumed that the backhaul savings are around 75% as well. If it is further assumed that the average amount of PRBs for cell edge UEs is smaller than for cell center UEs, more than 75% backhaul capacity savings may be expected.

Coordination of three cell edge beams in five cases (204 in FIG. 2): A pessimistic upper bound value for the sector area spectral efficiency gain for three cooperating cells (=two or one inter-site and one or two intra-site edge beams) is 200%. If it is assumed that a remainder of 25% of the cell edge beam UEs can be subject to inter-site CoMP sector area, spectral efficiency gain, on top of the beam splitting gain, would be 55%.

Figure 3:
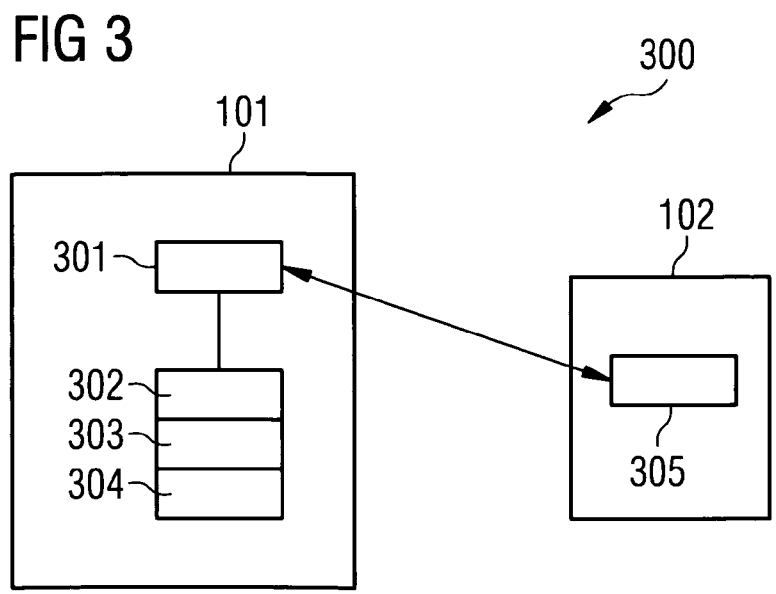
FIG. 3 shows a base station and a user equipment within a cellular network system according to an exemplary embodiment of the invention.

FIG. 3 shows a cellular network system 300 according to an exemplary embodiment of the invention. The cellular network system comprises a base station 101 and a user equipment 102.

The base station 101 may be any type of access point or point of attachment, which is capable of providing a wireless access to a telecommunication network. Thereby, the wireless access may be provided for a user equipment 102 or for any other network element, which is capable of communicating in a wireless manner.

The base station comprises a receiver as known by a skilled person. The base station may also comprise a transmitter. The receiver and the transmitter may be implemented as one single unit, for example as a transceiver 301 as shown in FIG. 3. The transceiver or the receiving unit and the transmitter may be adapted to communicate with a further base station (not shown) or the user equipment 102 via an antenna.

The base station 101 comprises further a control unit 302. The control unit may be implemented for example as part of a standard control unit, like a CPU or a microcontroller, or may be implemented as a single unit.

The control unit may be adapted to apply a vertical sectorization to the cooperation area, i.e. to the beams of the base stations being associated with the cooperation area.

The base station comprises further a determination unit 303 being adapted to determine the location of the user equipment within the cooperation area. The determination unit may be coupled with the transceiver and may be adapted to receive a signal via the transceiver or transmitter of the base station comprising information about the location of the user equipment.

Further, the base station comprises a configuration unit 304 being adapted to configure the communication channel between the base station and the user equipment by using coordinated multipoint processing, if the determined location of the user equipment corresponds to a predetermined location.

The control unit, the determination unit and the configuration unit may be part one integrated unit or may single units. They may also be part of a common control unit of the base station.

The user equipment (UE) 102 may be any type of communication end device, which is capable of connecting with the described base station. The UE may be in particular a cellular mobile phone, a Personal Digital Assistant (PDA), a notebook computer, a printer and/or any other movable communication device.

The user equipment may 102 comprise a transceiver 305 for transmitting and/or receiving signals to/from the base station 101. The transceiver may comprise a transmitting unit and a receiving unit. The transmitting unit may be a transmitter as known by a skilled person, and the receiving unit may be a common known receiver. The transceiver or the receiving and the transmitting unit may be adapted to communicate with the base station via an antenna.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the calculation unit, are at least in part provided in the form of respective computer programs which enable a processor device to provide the functionality of the respective entities as disclosed herein. According to other embodiments, any suitable entity disclosed herein may be provided in hardware. According to other-hybrid-embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps and the "a" or "an" does not exclude a plurality. It may also be possible in further refinements of the invention to combine features from different embodiments described herein above. It should also be noted that reference signs in the claims should not be construed as limiting the scope of the claims.

LIST OF REFERENCE SIGNS

100 Cell of a cellular network system
101 Base station
102 User equipment
110, 120 Cells assigned to base station
111, 121 Vertical beams of base station
200 Cooperating cells
201 Cell of vertical sectorization
202, 203 Cell of horizontal sectorization
204, 205, 206, 207 Overlap areas
300 Cellular network system
301 Transceiver of base station
302 Control unit of base station
303 Determination unit of base station
304 Configuration unit of base station
305 Transceiver of user equipment

The invention claimed is:

1. A method, comprising:
configuring, by a network component, a communication channel between the network component and a user equipment within a cellular network system, the cellular network system comprising at least one cooperation area, wherein the network component is assigned to the at least one cooperation area, and wherein the user equipment is served by the network component, comprising
    applying, by the network component, a vertical sectorization and thereby creating at least one cooperation area,
    determining, by the network component, the location of the user equipment in relation to the at least one cooperation area, and
    configuring, by the network component, the communication channel between the network component and the user equipment by using coordinated multipoint processing, if the determined location of the user equipment corresponds to a predetermined location, wherein the predetermined location corresponds to an overlap area between at least two cells of the at least one cooperation area being associated to the network component.

2. The method as set forth in claim 1, wherein the configuring the communication channel using the coordinated multipoint processing is using a coordinated multipoint processing set selection based on at least a determined horizontal orientation and a determined vertical orientation of the user equipment in the cellular network system.

3. The method as set forth in claim 1, wherein using coordinated multipoint processing is based on intra-site coordinated multipoint processing.

4. The method as set forth in claim 1, wherein the predetermined location corresponds to an overlap area between at least one cell of the cooperation area being associated to the network component and at least one cell of the cooperation area being associated to a further network component.

5. The method as set forth in claim 4, wherein using coordinated multipoint processing is based on inter-site coordinated multipoint processing.

6. The method as set forth in claim 1, wherein determining the location of the user equipment within the cooperation area comprises requesting, by the network component, neighbor cell measurements from the user equipment.

7. The method as set forth in claim 1, wherein determining the location of the user equipment within the cooperation area comprises establishing, by the network component, a connection to the user equipment within cells associated to the network component.

8. The method as set forth in claim 1, wherein applying the vertical sectorization to the cooperation area comprises applying a vertical beamforming.

9. The method as set forth in claim 1, further comprising determining whether the network capacity of the cellular network system is below a predetermined capacity, and if so, proceeding with the applying, by the network component, a vertical sectorization and thereby the creating of the at least one cooperation area, the determining, by the network component, the location of the user equipment in relation to the at least one cooperation area, and the configuring, by the network component, the communication channel between the network component and the user equipment by using coordinated multipoint processing, if the determined location of the user equipment corresponds to a predetermined location.

10. A base station for configuring a communication channel between the base station and a user equipment within a cellular network system, the cellular network system comprising at least one cooperation area, wherein the base station is assigned to the at least one cooperation area, and wherein the user equipment is served by the base station, the base station comprising
a control unit being adapted to apply a vertical sectorization and thereby to create the at least one cooperation area,
a determination unit being adapted to determine the location of the user equipment in relation to the at least one cooperation area,
a configuration unit being adapted to configure the communication channel between the base station and the user equipment by using coordinated multipoint processing, if the determined location of the user equipment corresponds to a predetermined location, wherein the predetermined location corresponds to an overlap area between at least two cells of the at least one cooperation area being associated to the base station.

11. A cellular network system for configuring a communication channel between a base station and a user equipment within the cellular network system, the cellular network system comprising a least one base station as set forth in claim 10.

12. The method as set forth in claim 1, wherein the vertical sectorization at least comprises applying a same system bandwidth to each of the at least two cells in the overlap area to create the at least one cooperation area, and wherein the creating increases an amount of radio resources available to the user equipment and reduces a power per physical resource block of each of the radio resources in the overlap area.

13. The method as set forth in claim 1, wherein the network component is embodied in a base station.

14. An apparatus comprising:
at least one processor; and
at least one memory including computer program code, where the at least one memory and the computer program code are configured, with the at least one processor, to cause the apparatus to at least:
configure a communication channel between a network component and a user equipment within a cellular network system, the cellular network system comprising at least one cooperation area, wherein the network component is assigned to the at least one cooperation area, and wherein the user equipment is served by the network component, comprising
applying, with the network component, a vertical sectorization and thereby creating at least one cooperation area,
determining, with the network component, the location of the user equipment in relation to the at least one cooperation area, and
configuring, with the network component, the communication channel between the network component and the user equipment by using coordinated multipoint processing, if the determined location of the user equipment corresponds to a predetermined location, wherein the predetermined location corresponds to an overlap area between at least two cells of the at least one cooperation area being associated to the network component.

15. The apparatus as set forth in claim 14, wherein using coordinated multipoint processing is based on intra-site coordinated multipoint processing.

16. The apparatus as set forth in claim 14, wherein the predetermined location corresponds to an overlap area between at least one cell of the cooperation area being associated to the network component and at least one cell of the cooperation area being associated to a further network component, andwherein using coordinated multipoint processing is based on inter-site coordinated multipoint processing.

17. The apparatus as set forth in claim 14, wherein determining the location of the user equipment within the cooperation area comprises requesting, by the network component, neighbor cell measurements from the user equipment.

18. The apparatus as set forth in claim 14, wherein determining the location of the user equipment within the cooperation area comprises establishing, by the network component, a connection to the user equipment within cells associated to the network component.

19. The apparatus as set forth in claim 14, wherein applying the vertical sectorization to the cooperation area comprises applying a vertical beamforming.

20. The apparatus as set forth in claim 14, wherein the at least one memory including the computer program code is configured with the at least one processor to cause the apparatus to determine whether the network capacity of the cellular network system is below a predetermined capacity, and if so, proceeding with the applying, by the network component, a vertical sectorization and thereby the creating of the at least one cooperation area, the determining, by the network component, the location of the user equipment in relation to the at least one cooperation area, and the configuring, by the network component, the communication channel between the network component and the user equipment by using coordinated multipoint processing, if the determined location of the user equipment corresponds to a predetermined location.

* * * * *